(12) United States Patent
Nakada (10) Patent No.: US 9,939,123 B2
(45) Date of Patent: Apr. 10, 2018

(54) VEHICLE LAMP

(71) Applicant: KOITO MANUFACTURING CO., LTD., Tokyo (JP)

(72) Inventor: Asami Nakada, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 140 days.

(21) Appl. No.: 14/902,126

(22) PCT Filed: Jun. 24, 2014

(86) PCT No.: PCT/JP2014/066619
§ 371 (c)(1),
(2) Date: Dec. 30, 2015

(87) PCT Pub. No.: WO2015/002013
PCT Pub. Date: Jan. 8, 2015

(65) Prior Publication Data
US 2016/0369967 A1    Dec. 22, 2016

(30) Foreign Application Priority Data

Jul. 2, 2013    (JP) .................................. 2013-138633

(51) Int. Cl.
*F21V 8/00* (2006.01)
*G02B 6/43* (2006.01)
(Continued)

(52) U.S. Cl.
CPC .......... *F21S 48/225* (2013.01); *B60Q 1/2607* (2013.01); *B60Q 1/28* (2013.01);
(Continued)

(58) Field of Classification Search
CPC .. F21S 48/225; F21S 48/2281; F21S 48/1208; F21S 48/212; F21S 48/2237;
(Continued)

(56) References Cited

U.S. PATENT DOCUMENTS 7,263,268 B2 *   8/2007   Inditsky ............... G02B 6/0011
                                                     362/623
7,401,963 B2 *   7/2008   Stefanov ............... F21S 48/215
                                                     362/551
(Continued)

FOREIGN PATENT DOCUMENTS

CN     102777843 A    11/2012
EP     2 584 249 A1    4/2013
(Continued)

OTHER PUBLICATIONS

EP 2,584,249; dated Apr. 24, 2013; Bisch; English Translation.*
(Continued)

*Primary Examiner* — Peggy Neils
(74) *Attorney, Agent, or Firm* — Osha Liang LLP (57) ABSTRACT

A light guide body includes a first rod-like light guide portion and second rod-like light guide portions which are spaced from the first rod-like light guide portion in the vertical direction and plate-like light guide portions which are disposed so as to link their circumferential surfaces. Light that reaches the first rod-like light guide portion via the plate-like light guide portions after being emitted from light sources and entering the second rod-like light guide portions is emitted forward of the lamp from the circumferential surface of the first rod-like light guide portion.

9 Claims, 9 Drawing Sheets

(51) Int. Cl.
*F21S 8/10* (2006.01)
*B60Q 1/26* (2006.01)
*B60Q 1/28* (2006.01)
*B60Q 1/34* (2006.01)

(52) U.S. Cl.
CPC ............ *B60Q 1/34* (2013.01); *F21S 48/1208* (2013.01); *F21S 48/215* (2013.01); *F21S 48/2212* (2013.01); *F21S 48/2237* (2013.01); *F21S 48/2243* (2013.01); *F21S 48/2268* (2013.01); *F21S 48/2281* (2013.01); *G02B 6/0075* (2013.01); *B60Q 2400/20* (2013.01); *G02B 6/0038* (2013.01)

(58) Field of Classification Search
CPC .. F21S 48/2243; F21S 48/2268; F21S 48/215; B60Q 1/2607; B60Q 1/28; B60Q 1/34
See application file for complete search history.

(56) References Cited

U.S. PATENT DOCUMENTS

| | | | | |
|---|---|---|---|---|
| 8,764,257 | B2 * | 7/2014 | De Lamberterie | B60Q 1/2607 362/228 |
| 9,242,594 | B2 * | 1/2016 | Nakada | G02B 6/002 |
| 2010/0073954 | A1 * | 3/2010 | Gebauer | F21S 48/2243 362/551 |
| 2012/0274462 | A1 | 11/2012 | Martinez et al. | |
| 2013/0003397 | A1 | 1/2013 | Buisson | |
| 2016/0193954 | A1 * | 7/2016 | Nakada | G02B 6/0078 362/511 |

FOREIGN PATENT DOCUMENTS

| | | |
|---|---|---|
| JP | 2005-209654 A | 8/2005 |
| JP | 2005-349989 A | 12/2005 |
| JP | 2012-004004 A | 1/2012 |
| JP | 2012-248358 A | 12/2012 |
| JP | 2013-513912 A | 4/2013 |
| JP | 2013-122872 | 6/2013 |

OTHER PUBLICATIONS

International Search Report issued in PCT/JP2014/066619 dated Sep. 9, 2014 (2 pages).
Written Opinion of the International Searching Authority issued in PCT/JP2014/066619 dated Sep. 9, 2014 (4 pages).
Office Action issued in corresponding Japanese Application No. 2013-138633, dated Sep. 15, 2017 (19 pages).

* cited by examiner

VEHICLE LAMP

CROSS-REFERENCE TO RELATED APPLICATIONS

The present application is a national stage application of PCT/JP2014/066619, and claims priority from Japanese Patent Application No. 2013-138633 filed on Jul. 2, 2013, the contents of which are incorporated herein in their entirety.

BACKGROUND

Technical Field

The present invention relates to a vehicle lamp having a light guide body.

Related Art

Conventionally, a vehicle lamp configuration is known that includes a light guide body that receives light emitted from a light source and emits guided light forward of the lamp.

In this configuration, in the case where the light guide body is a rod-like one, in general, light emitted from the light source is caused to enter one end face or both end faces of the rod-like light guide body.

Patent document 1 discloses a light guide body of a vehicle lamp having a configuration that includes a first rod-like light guide portion and a second rod-like light guide portion that branches off from a circumferential surface of the first rod-like light guide portion. In this light guide body, light emitted from a light source and entering one end face of the second rod-like light guide portion is guided to the first rod-like light guide portion.

Patent Documents

Patent document 1: JP-A-2012-4004

SUMMARY OF THE INVENTION

The employment of the light guide body configuration disclosed in Patent document 1 allows the first rod-like light guide portion to emit bright light.

However, where as in the light guide body disclosed in Patent document 1 the second rod-like light guide portion branches off from the circumferential surface of the first rod-like light guide portion, a portion around the branching point becomes a non-luminous portion, as a result of which unevenness occurs in the distribution of light emitted from the first rod-like light guide portion.

A vehicle lamp according to one or more embodiments of the present invention is equipped with a light guide body having first and second rod-like light guide portions and in which the first rod-like light guide portion can emit bright light in such a manner that unevenness in its light distribution is suppressed effectively.

A vehicle lamp according to one or more embodiments of the present invention comprises: a light source; and a light guide body which is disposed so as to receive light emitted from the light source and to emit guided light forward of the lamp, wherein: the light guide body comprises a first rod-like light guide portion and a second rod-like light guide portion which are disposed at separate positions and a plate-like light guide portion which is disposed so as to link circumferential surfaces of the first rod-like light guide portion and the second rod-like light guide portion; the second rod-like light guide portion is disposed so as to extend in a direction that the second rod-like light guide portion comes closer to the first rod-like light guide portion as the position goes from one end face of the second rod-like light guide portion to its other end face; the light source is disposed so that light emitted from it enters the second rod-like light guide portion through the one end face of the second rod-like light guide portion; and the first rod-like light guide portion emits, forward of the lamp, from the circumferential surface of the first rod-like light guide portion, light that reaches the first rod-like light guide portion via the plate-like light guide portion after entering the second rod-like light guide portion.

There are no particular limitations on the kind of the "light source," and it may be such a light-emitting element as a light-emitting diode or a laser diode, a light source bulb, or the like.

To form the "light guide body," the first rod-like light guide portion," the "second rod-like light guide portion," and the "plate-like light guide portion" may be either molded together as a single member or formed as separate members and integrated together by bonding, for example.

There are no particular limitations on the specific positional relationship between the "first rod-like light guide portion" and the "second rod-like light guide portion" as long as they are disposed at separate positions and the second rod-like light guide portion is disposed so as to extend in a direction that the second rod-like light guide portion comes closer to the first rod-like light guide portion as the position goes from its one end face to its other end face.

There are no particular limitations on the specific plate shape of the "plate-like light guide portion" as long as it is disposed so as to link the circumferential surfaces of the first rod-like light guide portion and the second rod-like light guide portion.

The "first rod-like light guide portion" is configured so as to emit, forward of the lamp, from its circumferential surface, light received from the light source. There are no particular limitations on the specific structure for implementing this function.

With the above configuration, part of light that is emitted from the light source and enters the second rod-like light guide portion 24 through its one end face then enters the plate-like light guide portion at various positions in the longitudinal direction of the second rod-like light guide portion as the light is guided by the second rod-like light guide portion. The second rod-like light guide portion is disposed so as to extend in a direction that the second rod-like light guide portion comes closer to the first rod-like light guide portion as the position goes from its one end face to its other end face. Therefore, when the light reaches the first rod-like light guide portion via the plate-like light guide portion after entering the plate-like light guide portion from the second rod-like light guide portion, the light has approximately uniform brightness levels at respective positions in the longitudinal direction of the first rod-like light guide portion. As a result, light that is emitted forward of the lamp from the circumferential surface of the first rod-like light guide portion also has approximately uniform brightness levels at respective positions in its longitudinal direction.

This may prevent a non-luminous portion occurring at a portion around the branching point of the second rod-like light guide portion from the first rod-like light guide portion, which in turn makes it possible to effectively suppress occurrence of unevenness in the distribution of light emitted from the first rod-like light guide portion.

Further, plural sets of a light source, a second rod-like light guide portion, and a plate-like light guide portion may be arranged parallel with a longitudinal direction of the first rod-like light guide portion.

With this configuration, the first rod-like light guide portion can emit more bright light. Since light entering each second rod-like light guide portion from the associated light source reaches the first rod-like light guide portion via the associated plate-like light guide portion, the first rod-like light guide portion can emit light in such a manner that occurrence of unevenness in its light distribution is suppressed effectively over a wide range in its longitudinal direction.

The light sources of the respective sets may be lit in such a manner that the number of lit light sources increases sequentially in the longitudinal direction of the first rod-like light guide portion as time elapses.

This configuration makes it possible to provide a vehicle lamp that functions as a turn signal lamp that is superior in the function of arousing attention of, for example the drivers of other vehicles.

A third rod-like light guide portion may be disposed between the first rod-like light guide portion and the second rod-like light guide portion, and the plate-like light guide portion may comprise a first plate-like light guide portion which links the circumferential surface of the first rod-like light guide portion and a circumferential surface of the third rod-like light guide portion and a second plate-like light guide portion which links the circumferential surfaces of the second rod-like light guide portion and the third rod-like light guide portion.

With this configuration, light reaching the third rod-like light guide portion in the form of approximately uniform light from each second rod-like light guide portion via the associated second plate-like light guide portion can then reach the first rod-like light guide portion in the form of more uniform light from the third rod-like light guide portion via the associated first plate-like light guide portion. Therefore, light that is emitted forward of the lamp from the circumferential surface of the first rod-like light guide portion can be given more uniform brightness levels at respective positions in its longitudinal direction.

The third rod-like light guide portion may extend parallel with the first rod-like light guide portion.

With this configuration, light reaching the first rod-like light guide portion the first plate-like light guide portion can be made more uniform.

According to one or more embodiments of the invention, in a vehicle lamp that is equipped with a light guide body having first and second rod-like light guide portions, the first rod-like light guide portion is allowed to emit bright light in such a manner that unevenness in its light distribution is suppressed effectively.

DETAILED DESCRIPTION

Embodiments of the present invention will be hereinafter described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
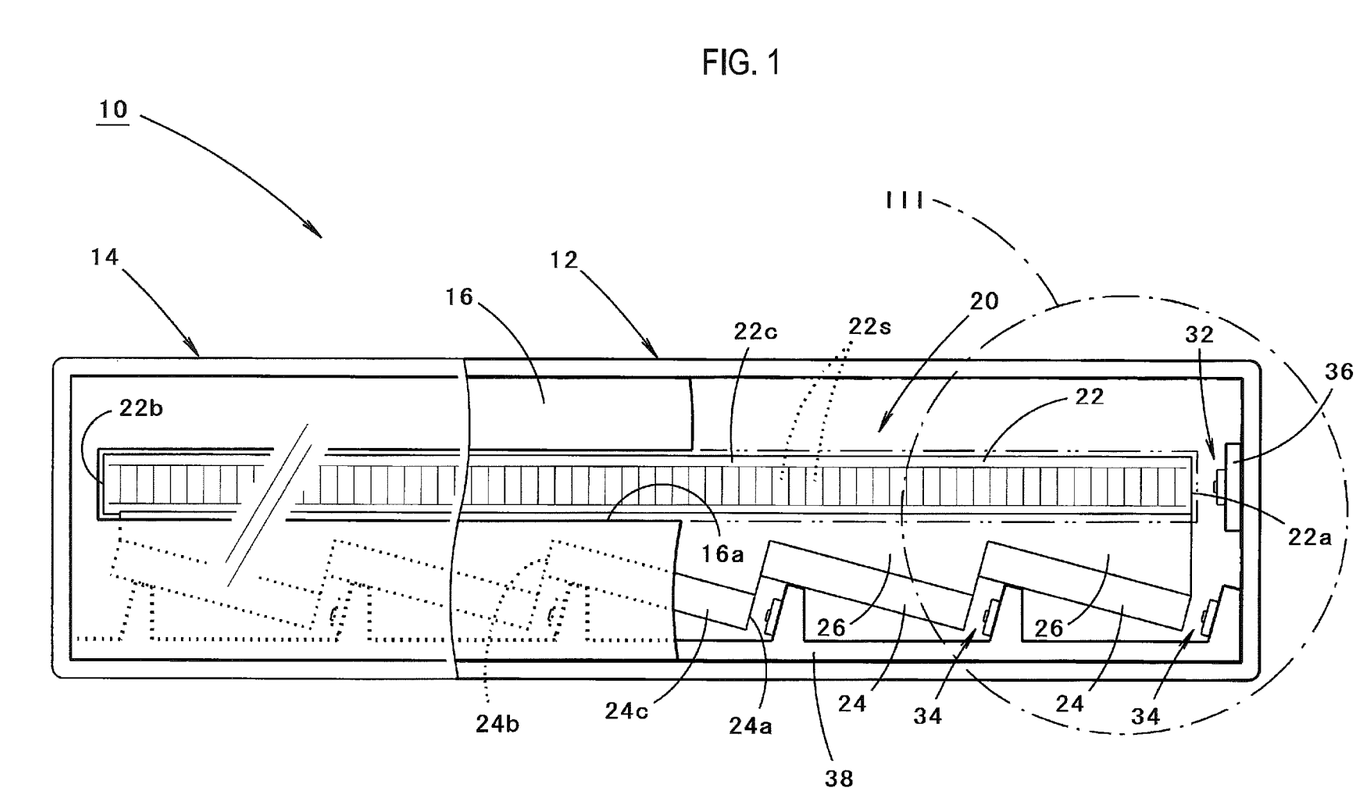
FIG. 1 is a front view of a vehicle lamp according to one or more embodiments of the present invention.
Figure 2:
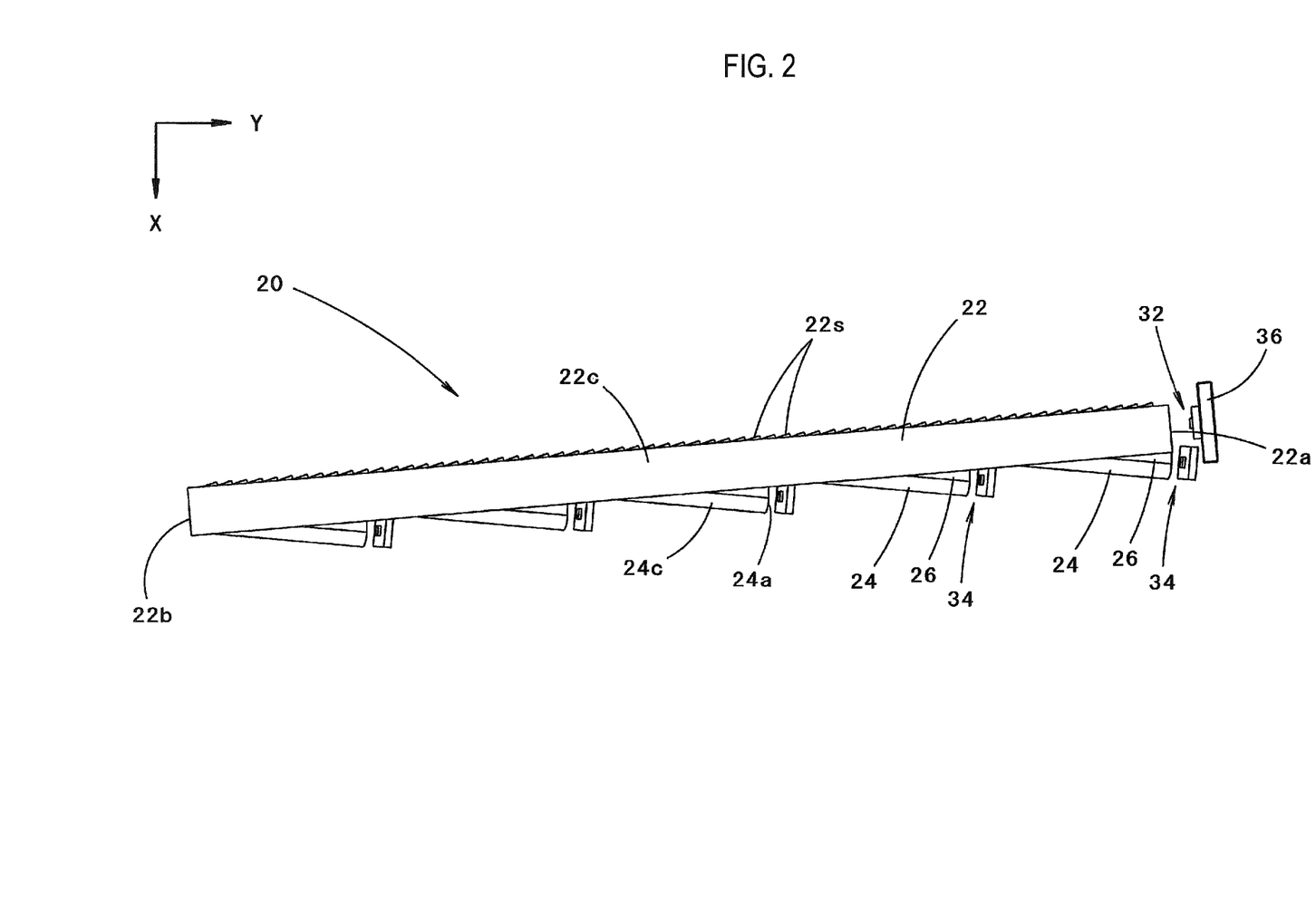
FIG. 2 is a plan view of major constituent elements of the above vehicle lamp.

FIG. 1 is a front view of a vehicle lamp 10 according to one or more embodiments of the invention. FIG. 2 is a plan view of major constituent elements of the vehicle lamp 10.

As shown in FIGS. 1 and 2, the vehicle lamp 10 according to one or more embodiments of the present invention is a combination lamp disposed at a front-left end position of a vehicle and functions as a clearance lamp and a front turn signal lamp.

The vehicle lamp 10 is equipped with a lamp body 12 and a seethrough transparent cover 14 which is attached to a front opening portion of the lamp body 12. A light guide body 20, light sources 32 and 34 which emit light to enter the light guide body 20, and a panel member 16 are disposed in a lamp room that is formed by the lamp body 12 and the transparent cover 14.

In FIG. 2, the direction indicated by X is the direction toward the front side (which is also the front side as viewed from the vehicle) and the direction indicated by Y is the leftward direction which is perpendicular to the direction toward the front side.

The light guide body 20 is equipped with a first rod-like light guide portion 22, second rod-like light guide portions 24 which are spaced from the first rod-like light guide portion 22 in the vertical direction of the vehicle lamp 10, and plate-like light guide portions 26 which are disposed so as to link a circumferential surface 22c of the first rod-like light guide portion 22 to circumferential surfaces 24c of the second rod-like light guide portions 24.

The first rod-like light guide portion 22 is disposed so as to extend long in a horizontal direction (vehicle width direction) and to be somewhat inclined so as to go rearward as the position goes from its right end face (left end face in a lamp front view) 22b to its left end face 22a.

On the other hand, five sets of a second rod-like light guide portion 24 and a plate-like light guide portion 26, for example, are arranged parallel with the longitudinal direction of the first rod-like light guide portion 22.

Each second rod-like light guide portion 24 is disposed below the first rod-like light guide portion 22 so as to extend in a direction that the second rod-like light guide portion 24 comes closer to the first rod-like light guide portion 22 as the position goes from its left end face 24a to its right end face 24b. Each second rod-like light guide portion 24 extends in a direction that is inclined from the longitudinal direction of the first rod-like light guide portion 22 by about 5° to 45° (e.g., about 15°).

The plate-like light guide portions 26, each of which is approximately shaped like a trapezoid in a lamp front view, are continuous with each other. Each plate-like light guide portion 26 is connected to the circumferential surface 24c of the associated second rod-like light guide portion 24 at its bottom end and to the circumferential surface 22c of the first rod-like light guide portion 22 at its top end.

The first rod-like light guide portion 22, the second rod-like light guide portions 24, and the plate-like light guide portions 26 are molded together, whereby the light guide body 20 is formed as a single member. The light guide body 20 is a colorless, transparent synthetic resin mold which is made of an acrylic resin, for example, and is supported by the lamp body 12 via support members (not shown).

The light source 32 is a light-emitting diode that emits white light, and is lit in a clearance lighting mode. The light source 32 is disposed in the vicinity of the left end face 22a of the first rod-like light guide portion 22 in such a manner that its light emission surface faces the left end face 22a. The light source 32 is supported by a light source support member 36, which is supported by the lamp body 12.

On the other hand, each light source 34 is a light-emitting diode that emits amber light, and is lit in a front turn signal lamp lighting mode. Each light source 34 is disposed in the vicinity of the left end face 24a of the associated second rod-like light guide portion 24 in such a manner that its light emission surface faces the left end face 24a. The light sources 34 are supported by a common light source support member 38, which is supported by the lamp body 12.

The panel member 16 is disposed in the lamp room so as to expose part of the light guide body 20 and to hide the other part behind it. More specifically, the panel member 16 has a horizontally long, rectangular opening 16a and only the first rod-like light guide portion 22 is exposed through the opening 16a.

Figure 3:
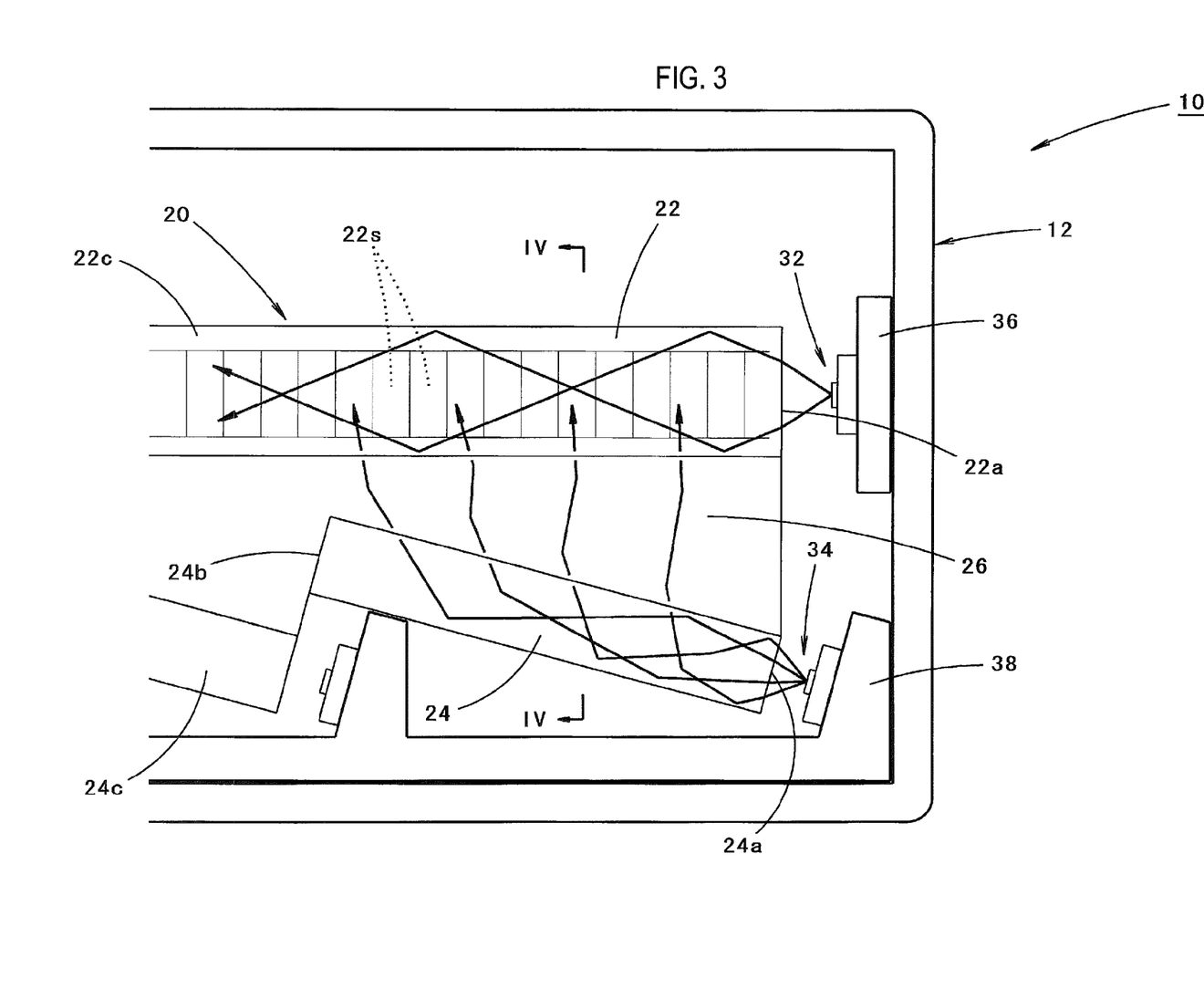
FIG. 3 is shows details of part III in FIG. 1.
Figure 4:
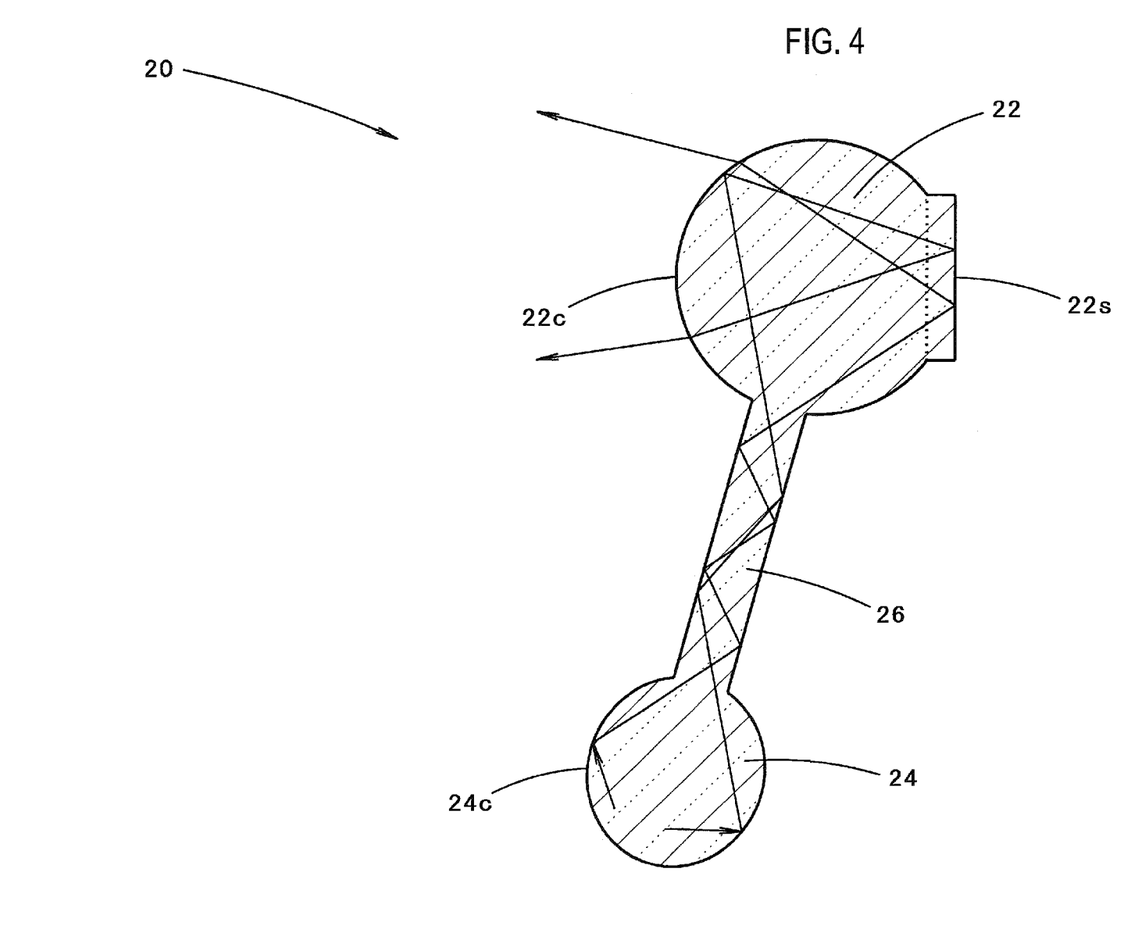
FIG. 4 is a sectional view taken along line IV-IV in FIG. 3.

FIG. 3 is shows details of part III in FIG. 1. FIG. 4 is a sectional view taken along line IV-IV in FIG. 3.

As shown in FIGS. 3 and 4, the circumferential surface 22c of the first rod-like light guide portion 22 has a cylindrical shape. The rear portion of the circumferential surface 22c is formed with plural reflection elements 22s which are continuous in the longitudinal direction of the first rod-like light guide portion 22 over its approximately entire length. Each reflection element 22s is formed so as to be wedge-shaped in a horizontal cross section and to extend in the vertical direction. The first rod-like light guide portion 22 receives, through the left end face 22a, light coming from the light source 32 and guides the light toward the right end face 22b by totally reflecting the light inside itself. The light that is guided by the first rod-like light guide portion 22 inside is emitted forward from the front portion of the circumferential surface 22c after being reflected inward by the reflection elements 22s.

On the other hand, the circumferential surface 24c of each second rod-like light guide portion 24 is shaped like a cylinder that is smaller in diameter than the first rod-like light guide portion 22. Each second rod-like light guide portion 24 receives, through the left end face 24a, light coming from the associated light source 34 and guides the light toward the right end face 24b by totally reflecting the light inside itself. Part of the light that is guided by the second rod-like light guide portion 24 inside goes into the associated plate-like light guide portion 26 at various positions in the longitudinal direction of the second rod-like light guide portion 24.

Each plate-like light guide portion 26 has a constant thickness that is smaller than or equal to ½ of the diameter of each second rod-like light guide portion 24. Each plate-like light guide portion 26 guides, upward, light received from the associated second rod-like light guide portion 24 through its bottom end while totally reflecting the light by its front and rear surfaces and thereby causes the light to enter the first rod-like light guide portion 22 through its top end.

Light beams that originate from the light sources 34 and reach the first rod-like light guide portion 22 via the second rod-like light guide portions 24 and the plate-like light guide portions 26 are also emitted forward from the front portion of the circumferential surface 22c after being reflected inward by the reflection elements 22s of the first rod-like light guide portion 22.

Figure 5A:
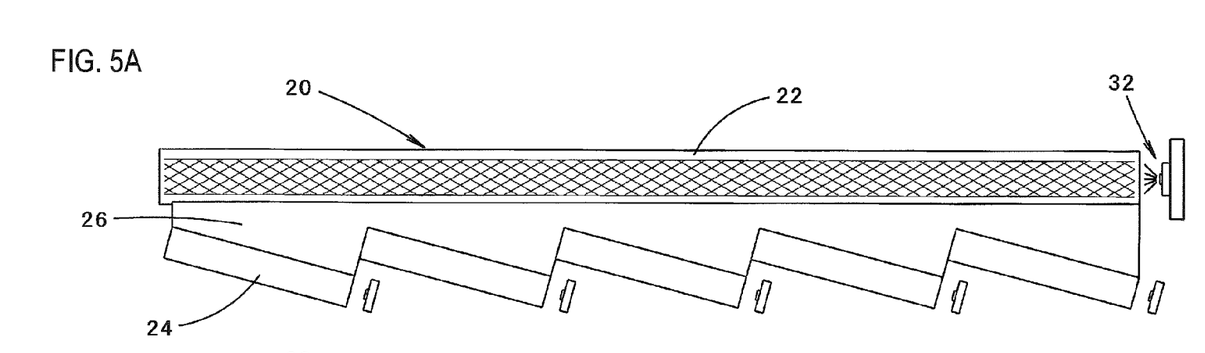
FIGS. 5A-5C are front views showing the major constituent elements of the above vehicle lamp and show an operation of the vehicle lamp according to one or more embodiments of the present invention.
Figure 5B:
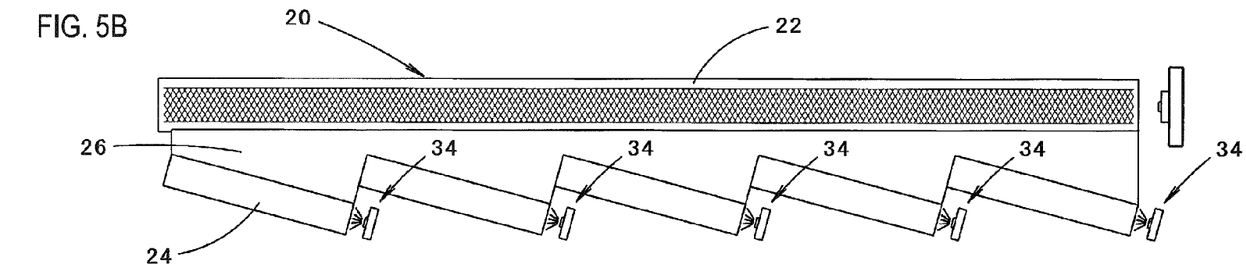
Figure 5C:
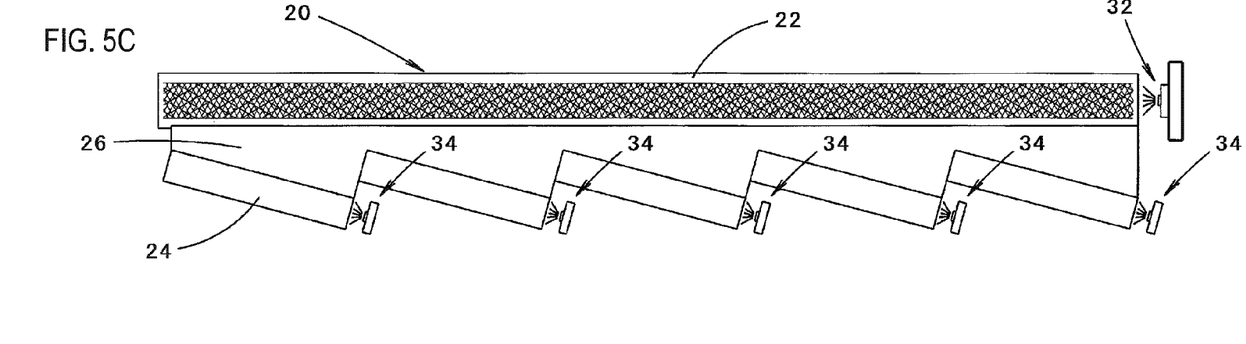

FIGS. 5A-5C are front views showing the major constituent elements of the vehicle lamp 10 and illustrates an operation thereof.

FIG. 5A shows the light guide body 20 in which only the light source 32 is lit. FIG. 5B shows the light guide body 20 in which only the light sources 34 are lit. FIG. 5C shows the light guide body 20 in which both of the light source 32 and the light sources 34 are lit.

As hatched in FIG. 5A, when the light source 32 is lit, the first rod-like light guide portion 22 emits light forward and thereby looks white. Thus, the vehicle lamp 10 functions as a clearance lamp. In this case, as hatched in FIG. 5A, the first rod-like light guide portion 22 looks to be shining approximately uniformly over its entire length.

As shown in FIG. 5B, when the light sources 34 are lit, the first rod-like light guide portion 22 emits light forward and thereby looks amber. Thus, the vehicle lamp 10 functions as a front turn signal lamp. In this case, as hatched in FIG. 5B, the first rod-like light guide portion 22 looks to be shining brightly and approximately uniformly over its entire length.

As shown in FIG. 5C, when the light source 32 and the light sources 34 are lit together, the first rod-like light guide portion 22 emits light forward and thereby appears to have a mixed color of white and amber. Thus, the vehicle lamp 10 functions as a clearance lamp and a front turn signal lamp. In this case, as indicated by double hatching in FIG. 5C, the first rod-like light guide portion 22 looks to be shining brightly and approximately uniformly over its entire length.

In the vehicle lamp 10 according to one or more embodiments of the present invention, the light guide body 20 is equipped with the first rod-like light guide portion 22, the second rod-like light guide portions 24 which are spaced from the first rod-like light guide portion 22, and the plate-like light guide portions 26 which are disposed so as to link the circumferential surface 22c of the first rod-like light guide portion 22 to the circumferential surfaces 24c of the second rod-like light guide portions 24. Furthermore, each second rod-like light guide portion 24 is disposed so as to extend in the direction that the second rod-like light guide portion 24 comes closer to the first rod-like light guide portion 22 as the position goes from its left end face 24a (i.e., one end face) to its right end face 24b (i.e., the other end face). As a result, light emitted from each light source 34 enters the associated second rod-like light guide portion 24 through its left end face 24a, reaches the first rod-like light guide portion 22 via the associated plate-like light guide portion 26, and is emitted forward of the lamp from the circumferential surface 22c of the first rod-like light guide portion 22. As a result, the following operations and advantages may be obtained.

Part of light that is emitted from each light source 34 and enters the associated second rod-like light guide portion 24 through its left end face 24a then enters the associated plate-like light guide portion 26 at various positions in the longitudinal direction of the second rod-like light guide portion 24. The second rod-like light guide portion 24 is disposed so as to extend in the direction that the second rod-like light guide portion 24 comes closer to the first rod-like light guide portion 22 as the position goes from its left end face 24a to its right end face 24b. Therefore, when the light reaches the first rod-like light guide portion 22 via the plate-like light guide portion 26 after entering the plate-like light guide portion 26 from the second rod-like light guide portion 24, the light has approximately uniform brightness levels at respective positions in the longitudinal direction of the first rod-like light guide portion 22. As a result, light that is emitted forward of the lamp from the circumferential surface 22c of the first rod-like light guide portion 22 also has approximately uniform brightness levels at respective positions in the longitudinal direction of the first rod-like light guide portion 22.

This may prevent a non-luminous portion occurring at a portion around the branching point of the second rod-like light guide portion from the first rod-like light guide portion, which in turn makes it possible to effectively suppress occurrence of unevenness in the distribution of light emitted from the first rod-like light guide portion 22.

As described above, according to one or more embodiments of the present invention, in the vehicle lamp 10 which is equipped with the light guide body 20 having the first rod-like light guide portion 22 and the second rod-like light guide portions 24, the first rod-like light guide portion 22 can emit bright light in such a manner that occurrence of unevenness in its light distribution is suppressed effectively.

Furthermore, in one or more embodiments of the present invention, the plural sets of a light source 34, a second rod-like light guide portion 24, and a plate-like light guide portion 26 are arranged parallel with the longitudinal direction of the first rod-like light guide portion 22, as a result of which the first rod-like light guide portion 22 can emit more bright light. With this configuration, light entering each second rod-like light guide portion 24 from the associated light source 34 reaches the first rod-like light guide portion 22 via the associated plate-like light guide portion 26. Therefore, the first rod-like light guide portion 22 can emit light in such a manner that occurrence of unevenness in its light distribution is suppressed over a long range in its longitudinal direction.

In one or more embodiments of the present invention, the light source 32 is disposed so that light emitted from it enters the first rod-like light guide portion 22 through its left end face 22a. Therefore, as light emitted from the light source 32 is guided inside the first rod-like light guide portion 22, the light is also reflected by the reflection elements 22s so as to be emitted forward from the front portion of the circumferential surface 22c of the first rod-like light guide portion 22. The first rod-like light guide portion 22 can emit light in this manner.

As described above, the vehicle lamp 10 according to one or more embodiments of the present invention can function as a clearance lamp by causing the first rod-like light guide portion 22 to shine in white by lighting the light source 32 which emits white light. The vehicle lamp 10 according to one or more embodiments of the present invention can function as a front turn signal lamp by causing the first rod-like light guide portion 22 to shine in amber by lighting the light sources 34 which emit amber light.

Furthermore, in one or more embodiments of the present invention, the panel member 16 is disposed in the lamp room and only the first rod-like light guide portion 22 of the light guide body 20 is exposed through its horizontally long, rectangular opening 16a. As a result, the vehicle lamp 10 is enhanced in design in that only the first rod-like light guide portion 22 is seen like a long and narrow band while its necessary lamp functions are maintained.

Although in one or more of the above embodiments, the first rod-like light guide portion 22 and each second rod-like light guide portion 24 has a circular cross section, another configuration is possible in which they have some other sectional shape.

Although in one or more of the above embodiments, each plate-like light guide portion 26 has a constant thickness, another configuration is possible in which the thickness of each plate-like light guide portion 26 varies.

Although in one or more of the above embodiments, each second rod-like light guide portion 24 is locate below the first rod-like light guide portion 22, another configuration is possible in which each second rod-like light guide portion 24 is disposed in some other position (e.g., above the first rod-like light guide portion 22).

Although in one or more of the above embodiments, the rear portion of the circumferential surface 22c of the first rod-like light guide portion 22 is formed with the plural reflection elements 22s which have a wedge-shaped horizontal cross section and are continuous in the longitudinal direction of the first rod-like light guide portion 22, another configuration is possible in which plural reflection elements 22s are formed that have a sectional shape other than a wedge shape or arranged in the longitudinal direction with breaks.

Although in one or more of the above embodiments, the rear portion of the circumferential surface 22c of the first rod-like light guide portion 22 is formed with the plural reflection elements 22s, another configuration is possible in which a front surface or a rear surface of the first rod-like light guide portion 22 is subjected to light diffusion treatment such as texturing rather than formation of the plural reflection elements 22s.

Although in one or more of the above embodiments, the light source 32 is disposed in the vicinity of the left end face 22a of the first rod-like light guide portion 22, another configuration is possible in which the light source 32 is disposed in the vicinity of the right end face 22b of the first rod-like light guide portion 22 or plural light sources are disposed in the vicinities of the left end face 22a and the right end face 22b of the first rod-like light guide portion 22, respectively.

Although in one or more of the above embodiments, each of the light source 32 and the light sources 34 is a light-emitting diode, another configuration is possible in which some other kind of light source is used.

Although in one or more of the above embodiments, the first rod-like light guide portion 22, the second rod-like light guide portions 24, and the plate-like light guide portions 26 are molded together as a single member, another configuration is possible in which the first rod-like light guide portion 22, the second rod-like light guide portions 24, and the plate-like light guide portions 26 are formed as separate members and integrated together by bonding, for example.

Although in one or more of the above embodiments, the first rod-like light guide portion 22 is disposed so as to extend in the vehicle width direction, another configuration is possible in which the first rod-like light guide portion 22 is disposed so as to extend in the vertical direction or an oblique direction.

Although in one or more of the above embodiments, the vehicle lamp 10 is a combination lamp disposed at a front-left end position of the vehicle, operations and advantages similar to the ones obtained by one or more of the above embodiments can be obtained by employing a configuration similar to the configuration of one or more of the above embodiments, irrespective of the installation position in a vehicle or the functions required. For example, a vehicle lamp 10 may be implemented as a combination lamp disposed at a rear-left end position or a rear-right end position of a vehicle. In this case, a combination lamp that functions as a tail lamp and a rear turn signal lamp can be provided by employing a light-emitting diode that emits red light as the light source 32 and lighting it in a tail lamp lighting mode.

Next, modifications will be described.

First, a first modification will be described.

FIGS. 6A-6E show major constituent elements of a vehicle lamp according to this modification together with operations thereof.

As shown in FIGS. 6A-6E, whereas the configuration involving the major constituent elements is in itself the same as in one or more of the above embodiments, settings are made so that the five light sources 34 are lit in such a manner that the number of lit light sources 34 increases sequentially in the longitudinal direction of the first rod-like light guide portion 22 as time elapses.

Figure 6A:
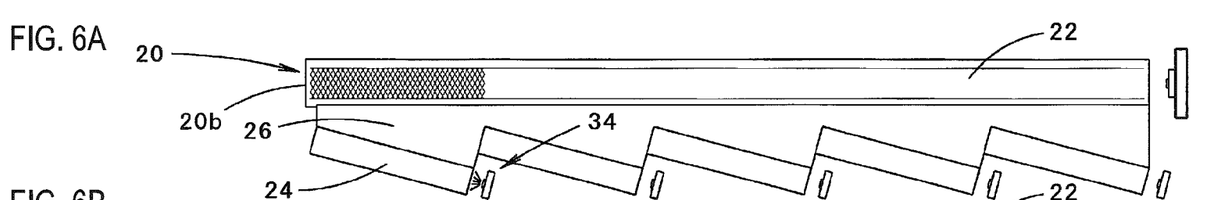
FIGS. 6A-6E show major constituent elements of a vehicle lamp according to a first modification together with an operation thereof.
Figures 6B, 6C:
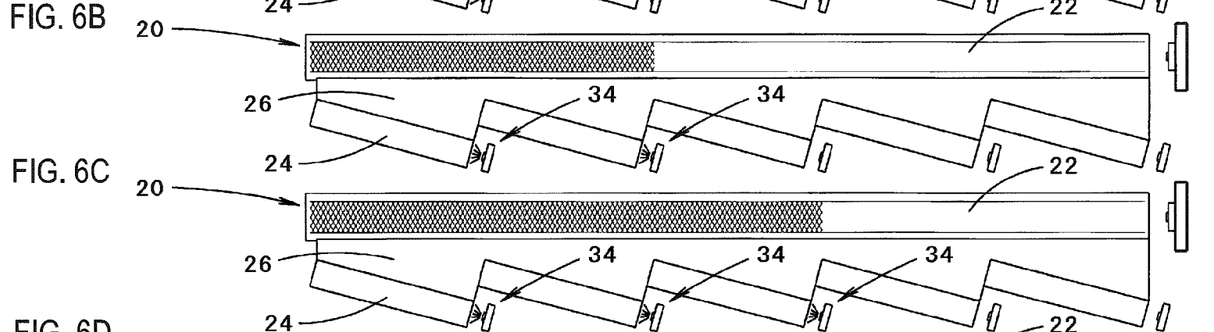
Figures 6D, 6E:
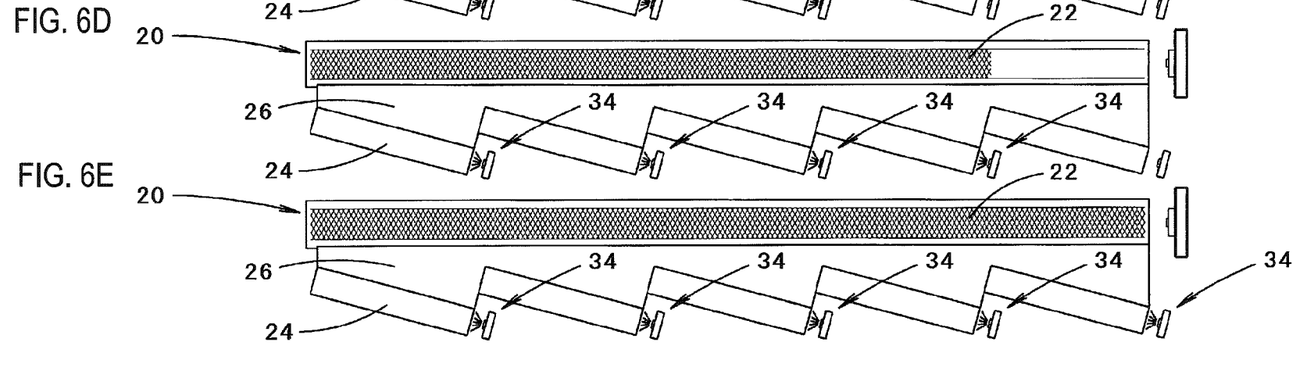

More specifically, first, as shown in FIG. 6A, only the first light source 34 that is the innermost one in the vehicle width direction (i.e., closest to the right end face 22b of the first rod-like light guide portion 22) is lit. Then, as shown in FIG. 6B, the second light source 34 is lit additionally. Then, as shown in FIG. 6C, the third light source 34 is lit additionally. Subsequently, as shown in FIG. 6D, the fourth light source 34 is lit additionally. Finally, as shown in FIG. 6E, all of the five light sources 34 are lit.

As a result, the light emission area of the first rod-like light guide portion 22 is increased gradually from the innermost region in the vehicle width direction in the order indicated by FIGS. 6A-6E.

This modification makes it possible to provide a vehicle lamp that functions as a front turn signal lamp that is superior in the function of arousing attention of, for example, the drivers of other vehicles.

Next, a second modification will be described.

Figure 7:
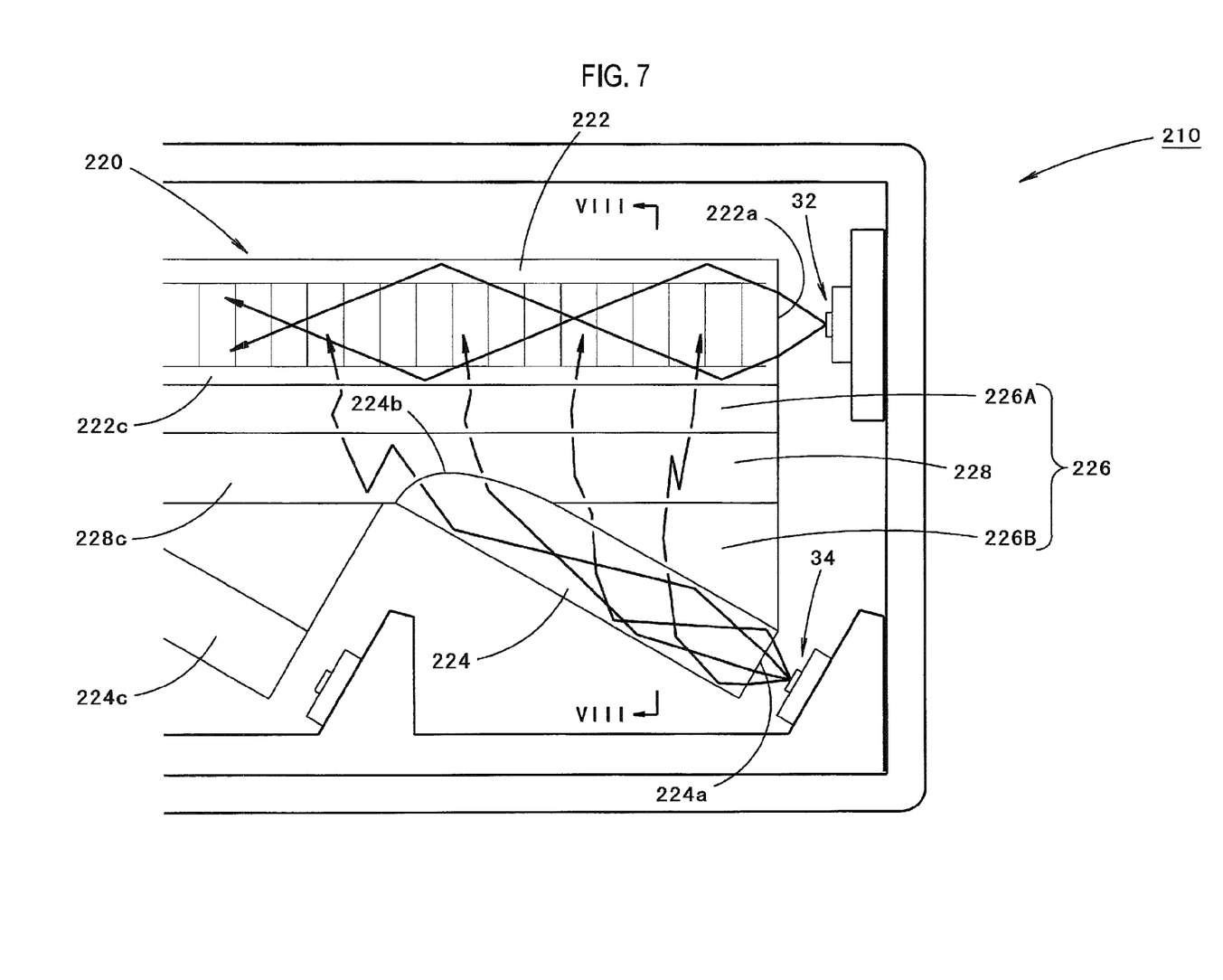
FIG. 7 shows an essential part of a vehicle lamp according to a second modification.
Figure 8:
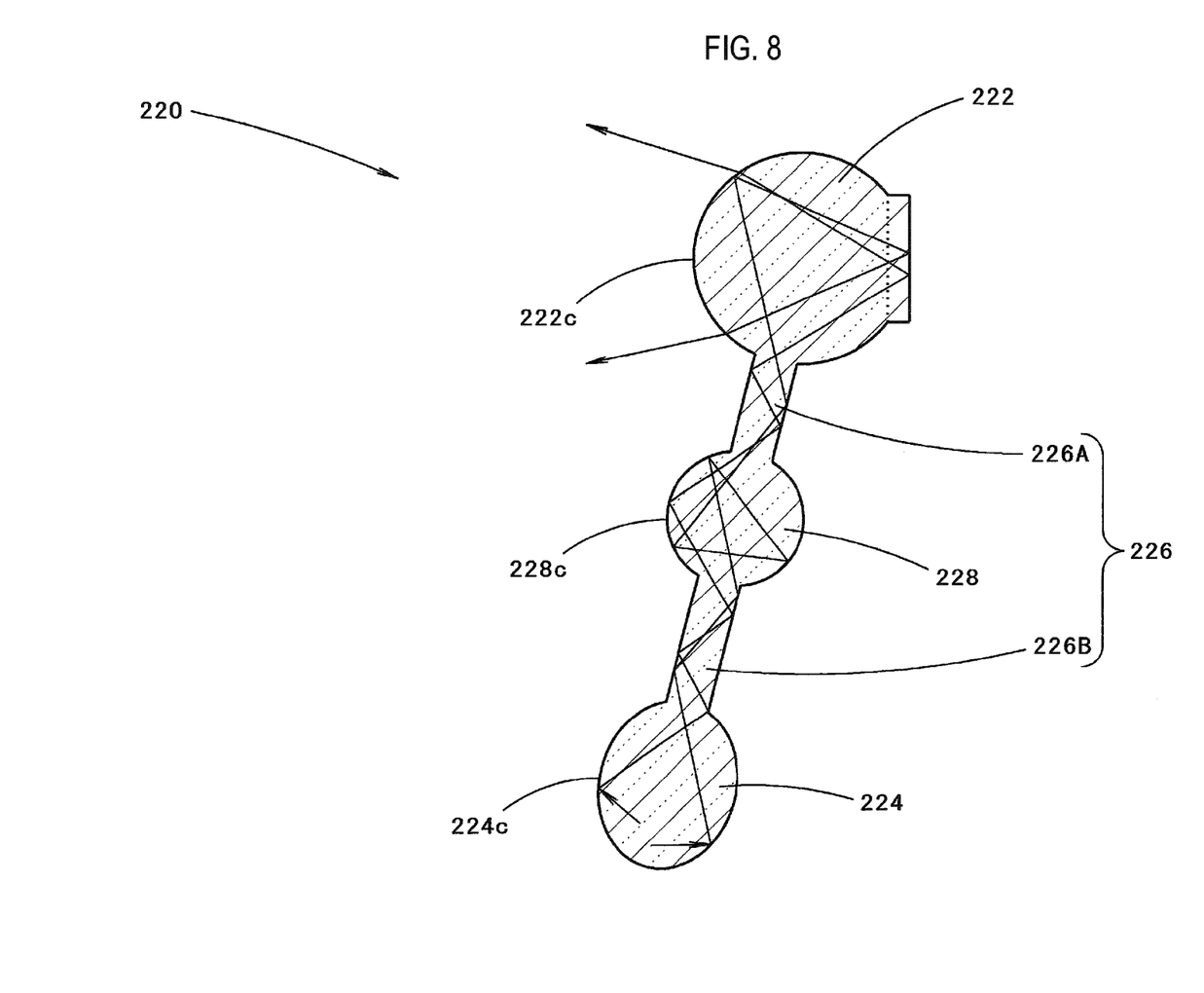
FIG. 8 is a sectional view taken along line VIII-VIII in FIG. 7.

FIG. 7 shows an essential part of a vehicle lamp 210 according to this modification. FIG. 8 is a sectional view taken along line VIII-VIII in FIG. 7.

As shown in FIGS. 7 and 8, whereas the basic configuration of the vehicle lamp 210 according to the modification is similar to that of one or more of the above embodiments, part of the structure of a light guide body 220 is different than the counterpart of one or more of the above embodiments.

More specifically, also in the modification, plural sets of a second rod-like light guide portion 224 and a plate-like light guide portion 226 are arranged below a long first rod-like light guide portion 222 extending in a horizontal direction parallel with the longitudinal direction of the first rod-like light guide portion 222. Each second rod-like light guide portion 224 is disposed so as to extend in a direction that the second rod-like light guide portion 224 comes closer to the first rod-like light guide portion 222 as the position goes from its left end face 224a to its right end face 224b. A light source 32 is disposed in the vicinity of a left end face 222a of the first rod-like light guide portion 222, and a light source 34 is disposed in the vicinity of the left end face 224a of each second rod-like light guide portion 224.

However, in the modification, the interval between the first rod-like light guide portion 222 and each second rod-like light guide portion 224 is somewhat longer than the corresponding interval in one or more of the above embodiments and a third rod-like light guide portion 228 is disposed between the first rod-like light guide portion 222 and the second rod-like light guide portions 224. The third rod-like light guide portion 228 is disposed so as to extend parallel with the first rod-like light guide portion 222 over the entire length of the first rod-like light guide portion 222. The right end face 224b of each second rod-like light guide portion 224 is connected to the third rod-like light guide portion 228.

The plate-like light guide portions 226 of the modification include first plate-like light guide portions 226A which link a circumferential surface 222c of the first rod-like light guide portion 222 to a circumferential surface 228c of the third rod-like light guide portion 228 and second plate-like light guide portions 226B which link the circumferential surface 228c of the third rod-like light guide portion 228 to circumferential surfaces 224c of the second rod-like light guide portions 222, respectively. The first plate-like light guide portions 226A are continuous with each other and the second plate-like light guide portions 226B are separated from each other.

With the configuration of the modification, light emitted from each light source 34 reaches the third rod-like light guide portion 228 in the form of approximately uniform light from the associated second rod-like light guide portion 224 directly or via the associated second plate-like light guide portion 226B and then reaches the first rod-like light guide portion 222 in the form of more uniform light from the third rod-like light guide portion 228 via the associated first plate-like light guide portions 226A. Therefore, light that is emitted forward of the lamp from the circumferential surface 222c of the first rod-like light guide portion 222 can be given more uniform brightness levels at respective positions in the longitudinal direction of the first rod-like light guide portion 222.

In this connection, in the modification, since the third rod-like light guide portion 228 is disposed so as to extend parallel with the first rod-like light guide portion 222, light that reaches the first rod-like light guide portion 222 via the first plate-like light guide portions 226 can be made more uniform.

Next, a third modification will be described.

Figure 9:
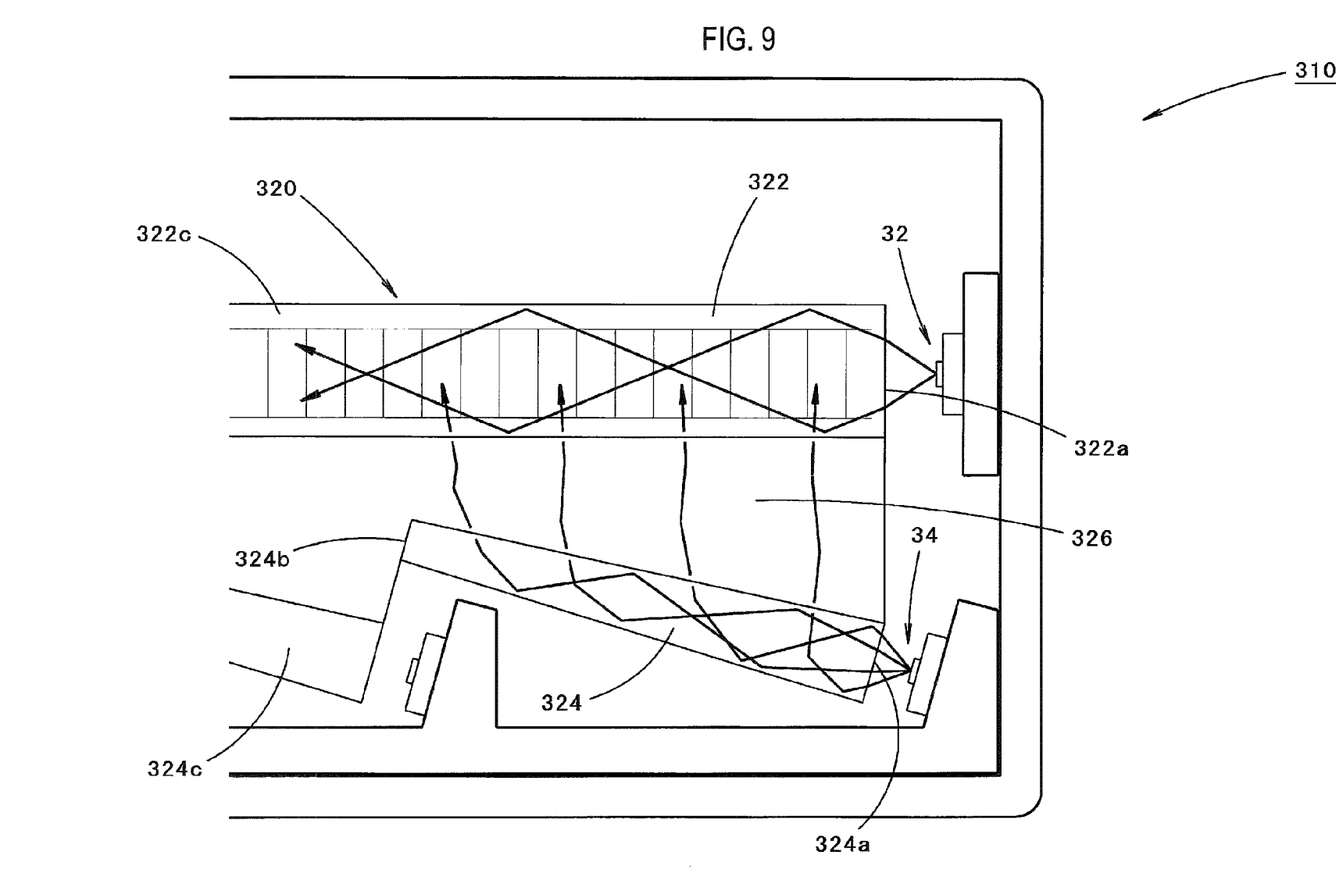
FIG. 9 shows an essential part of a vehicle lamp according to a third modification.

FIG. 9, which is similar to FIG. 3, shows an essential part of a vehicle lamp 310 according to this modification.

As shown in FIG. 9, whereas the basic configuration of the vehicle lamp 310 according to the modification is similar to that of one or more of the above embodiments, part of the structure of a light guide body 320 is different than the counterpart of one or more of the above embodiments.

More specifically, also in the light guide body 320 according to the modification, plural sets of a second rod-like light guide portion 324 and a plate-like light guide portion 326 are arranged below a long first rod-like light guide portion 322 extending in a horizontal direction parallel with the longitudinal direction of the first rod-like light guide portion 322. Each second rod-like light guide portion 324 is disposed so as to extend in a direction that the second rod-like light guide portion 324 comes closer to the first rod-like light guide portion 322 as the position goes from its left end face 324a to its right end face 324b. A light source 32 is disposed in the vicinity of a left end face 322a of the first rod-like light guide portion 322, and a light source 34 is disposed in the vicinity of the left end face 324a of each second rod-like light guide portion 324.

However, in the modification, a circumferential surface 324c of each second rod-like light guide portion 324 is not cylindrical but conical, that is, its diameter decreases gradually as the position goes from the left end face 324a to the right end face 324b. The diameter of the left end face 324a of each second rod-like light guide portion 324 is set the same as that of the second rod-like light guide portion 24 of one or more of the above embodiments, and the diameter of its right end face 324b is set somewhat larger than the thickness of each plate-like light guide portion 326.

Also where the configuration of the modification is employed, part of light that is emitted from each light source 34 and enters the associated second rod-like light guide portion 324 through its left end face 324a then enters the associated plate-like light guide portion 326 at various positions in the longitudinal direction of the second rod-like light guide portion 324. The second rod-like light guide portion 324 is disposed so as to extend in a direction that the second rod-like light guide portion 324 comes closer to the first rod-like light guide portion 322 as the position goes from its left end face 324a to its right end face 324b. Therefore, when the light reaches the first rod-like light guide portion 322 via the plate-like light guide portion 326 after entering the plate-like light guide portion 326 from the second rod-like light guide portion 324, the light has approximately uniform brightness levels at respective positions in the longitudinal direction of the first rod-like light guide portion 322. As a result, light that is emitted forward of the lamp from the circumferential surface 322c of the first rod-like light guide portion 322 also has approximately uniform brightness levels at respective positions in the longitudinal direction of the first rod-like light guide portion 322.

In addition, where the configuration of the modification is employed, almost the entire light guided by each second rod-like light guide portion 324 can be caused to enter the associated plate-like light guide portion 326 before reaching its right end face 324b. This makes it possible to increase the efficiency of utilization of exit light of each light source 34.

The numerical values of the various parameters mentioned in one or more of the above embodiments and modifications are just examples and these parameters may be given different values as appropriate.

The invention is not limited to the configurations described above, and various other modified configurations can be employed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle lamp comprising:
   a light source; and
   a light guide body which is disposed so as to receive light emitted from the light source and to emit guided light forward of the lamp,
   wherein the light guide body comprises:
      a first rod-like light guide portion and a second rod-like light guide portion which are disposed at separate positions, and
      a plate-like light guide portion which is disposed so as to link circumferential surfaces of the first rod-like light guide portion and the second rod-like light guide portion,
   wherein the second rod-like light guide portion is disposed so as to extend in a direction that the second rod-like light guide portion comes closer to the first rod-like light guide portion as the position goes from one end face of the second rod-like light guide portion to its other end face,
   wherein the light source is disposed so that light emitted therefrom enters the second rod-like light guide portion through the one end face of the second rod-like light guide portion, and
   wherein the first rod-like light guide portion emits, forward of the lamp, from the circumferential surface of the first rod-like light guide portion, light that reaches the first rod-like light guide portion via the plate-like light guide portion after entering the second rod-like light guide portion.

2. The vehicle lamp according to claim 1, wherein plural sets of a light source, a second rod-like light guide portion, and a plate-like light guide portion are arranged parallel with a longitudinal direction of the first rod-like light guide portion.

3. The vehicle lamp according to claim 2, wherein the light sources of the respective sets are lit in such a manner that the number of lit light sources increases sequentially in the longitudinal direction of the first rod-like light guide portion as time elapses.

4. The vehicle lamp according to claim 1,
   wherein a third rod-like light guide portion is disposed between the first rod-like light guide portion and the second rod-like light guide portion, and
   wherein the plate-like light guide portion comprises:
      a first plate-like light guide portion which links the circumferential surface of the first rod-like light guide portion and a circumferential surface of the third rod-like light guide portion, and
      a second plate-like light guide portion which links the circumferential surfaces of the second rod-like light guide portion and the third rod-like light guide portion.

5. The vehicle lamp according to claim 4, wherein the third rod-like light guide portion extends parallel with the first rod-like light guide portion.

6. The vehicle lamp according to claim 2,
   wherein a third rod-like light guide portion is disposed between the first rod-like light guide portion and the second rod-like light guide portion, and
   wherein the plate-like light guide portion comprises:
      a first plate-like light guide portion which links the circumferential surface of the first rod-like light guide portion and a circumferential surface of the third rod-like light guide portion, and
      a second plate-like light guide portion which links the circumferential surfaces of the second rod-like light guide portion and the third rod-like light guide portion.

7. The vehicle lamp according to claim 3,
   wherein a third rod-like light guide portion is disposed between the first rod-like light guide portion and the second rod-like light guide portion, and
   wherein the plate-like light guide portion comprises:
      a first plate-like light guide portion which links the circumferential surface of the first rod-like light guide portion and a circumferential surface of the third rod-like light guide portion, and a second plate-like light guide portion which links the circumferential surfaces of the second rod-like light guide portion and the third rod-like light guide portion.

8. The vehicle lamp according to claim 1,
wherein the circumferential surface of the second rod-like light guide portion is shaped as a cylinder that has a smaller diameter than the first rod-like light guide portion.

9. The vehicle lamp according to claim 1,
wherein the light source comprises a first light source and a second light source,
wherein the first light source emits white light,
wherein the second light source emits amber light, and
wherein the first light source is disposed so as to emit light that enters the first rod-like light guide portion through an end face thereof.

* * * * *